July 5, 1966 KUNIO NISHIOKA ET AL 3,259,212
METHOD AND APPARATUS FOR DAMPING THE VIBRATION OF POLES
Filed July 1, 1964 4 Sheets-Sheet 4

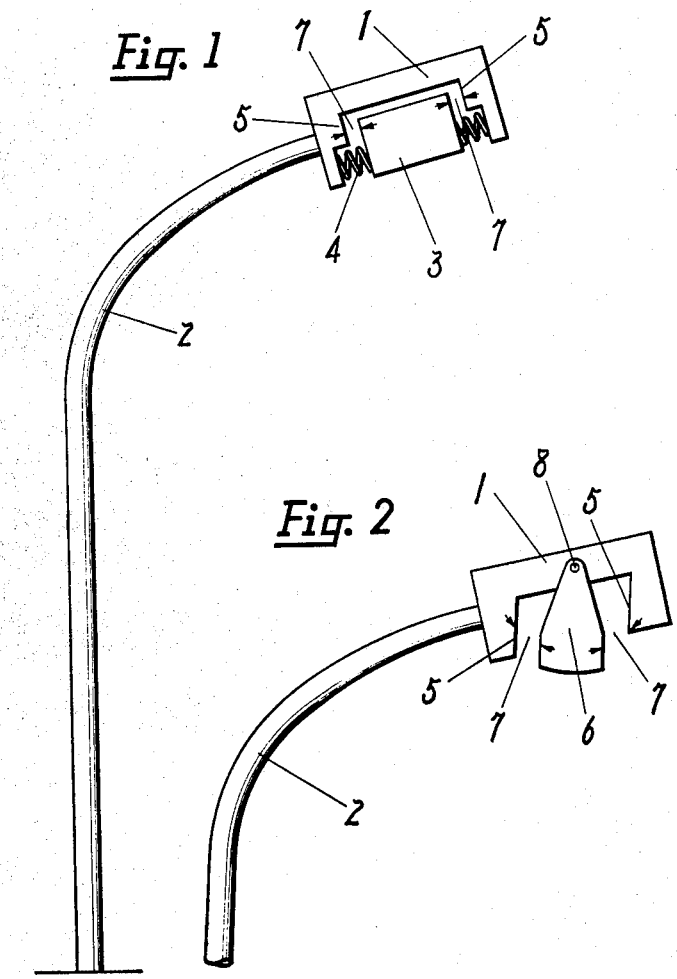

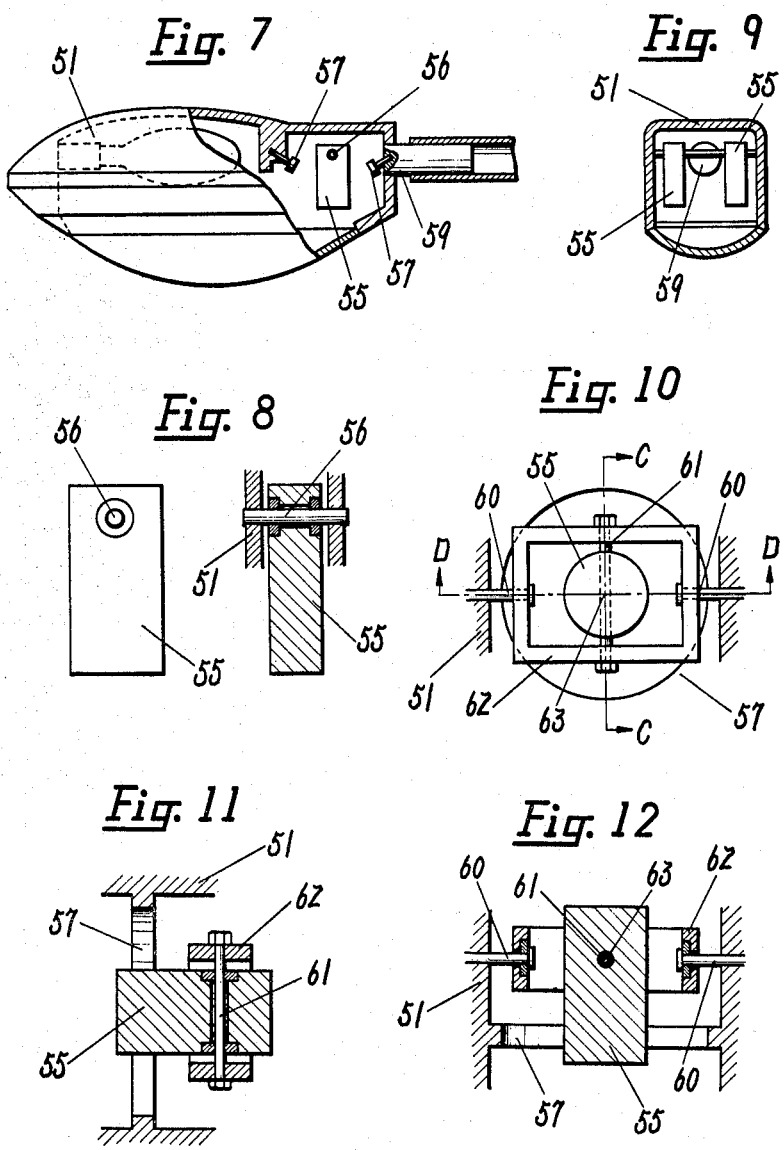

INVENTORS
Kunio Nishioka
Seiichi Yoshimura
Susumu Hamahata
Suguru Sakamoto
BY Watson, Cole, Grindle & Watson
ATTORNEYS

United States Patent Office 3,259,212
Patented July 5, 1966

3,259,212
METHOD AND APPARATUS FOR DAMPING THE VIBRATION OF POLES
Kunio Nishioka, Kyoto, Kyoto, Seiichi Nishimura, Nishinomiya, Hyogo, Susumu Hamahata, Amagasaki, Hyogo, and Suguru Sakamoto, Fuse, Osaka, Japan, assignors to Sumitomo Metal Industries Limited, Osaka, Japan, a corporation of Japan
Filed July 1, 1964, Ser. No. 379,506
Claims priority, application Japan, July 5, 1963, 38/35,711; Sept. 2, 1963, 38/66,352; Dec. 30, 1963, 38/71,657
7 Claims. (Cl. 188—1)

This invention relates to vibration damping methods and apparatuses which are easy to set in such poles as, for example, lighting poles and sign poles and are quickly effective to damp the vibration of the poles.

More particularly the present invention relates to a vibration damping method and apparatuses comprising, a pendulum, springs or elements performing the same action as of the springs and stoppers provided at a fixed distance from said pendulum so that, when the pole is excited and begins to vibrate, the vibrating energy of the pole may be first transmitted to the vibrating system consisting of the pendulum and the springs, the vibrating energy of the pendulum may be dissipated by the collision with the stoppers and thus the vibration of the pole may be quickly damped.

Further, the present invention relates to a vibration damping apparatus in the form of a short cylindrical case which can be easily fitted in any position in a pole and is high in the vibration damping effect and a vibration damping apparatus employing a physical pendulum instead of the pendulum-spring vibrating system which can be easily fitted in a sign board or lighting globe and is high in the vibration damping effect.

In case a vibrating energy in any form is given from outside to a pole which is low in the damping action, the pole will vibrate and will not easily stop. Such vibration is not only undesirable to the pole user but also must be quickly stopped even from the standpoint of the strength of the pole itself. In order to damp such vibration, there is a damping apparatus utilizing a viscus damping or a coulomb friction. However, with such damping apparatus, a relative vibration between two things will be utilized and size of apparatus will become large and thus the appearance of such pole as a lighting or sign pole will be greatly impaired.

With the development of superhighways, tubular poles of various forms are used as lighting poles and sign poles for roads and bridges. However, they are always excited by passing vehicles such as automobiles and therefore have defects that the lighting globes and sign boards fixed to the tips of such poles will be vibrated so much as to be short-lived, fatigued or broken and that the lighting of the globes will be so unstable as to more fatigue the drivers and to cause them to misdrive.

An object of the present invention is to quickly and effectively stop the vibration of poles.

Another object of the present invention is to make the vibration damping apparatus to be used therefor so simple and small in the construction as to be able to be easily fitted to a part of the pole.

The present invention relates to a method and apparatus wherein a small pendulum is fitted to a pole which is low in the damping action through springs or resilient elements performing the same action as of the springs so that, when the pendulum is relatively vibrated above a fixed amplitude, the pendulum may collide with a part of the pole through stoppers its vibrating energy may be dissipated, the vibrating energy of the pole may be thereby reduced and the vibration may be quickly damped.

In the accompanying drawings,

FIGURE 1 is a sectional side view of a vibration damping apparatus of the present invention as fitted to a part of a pole.

FIGURE 2 is a sectional side view of another vibration damping apparatus of the present invention as fitted to a part of a pole.

FIGURE 7 is a partly sectional side view of a vibration damping apparatus of the present invention as contained in a lighting globe.

FIGURES 8A and 8B are a magnified side view and elevation of the physical pendulum part of the above apparatus, respectively.

FIGURE 9 is an elevation of a vibration damping apparatus of the present invention as fitted on each side of the tip of a pole.

FIGURE 10 is a plan view of an embodiment made possible to swing in any direction.

FIGURE 11 is a cross-sectional view on line C—C in FIGURE 10.

FIGURE 12 is a cross-sectional view on line D—D in FIGURE 11.

Figure 3:
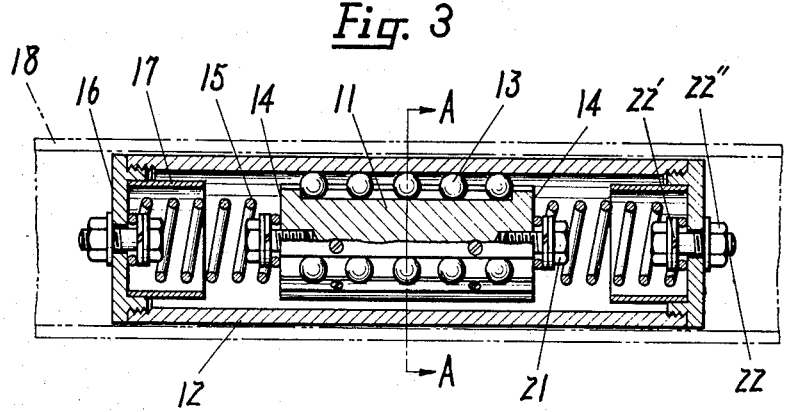
FIGURE 3 is an axially sectional view of a vibration damping apparatus of the present invention as set in the form of a cylinder and inserted in a tubular pole.

The vibration damping apparatus of the present invention is generally formed as illustrated in FIGURE 1 of a pendulum 3 fitted through springs 4 to the part of the largest vibration of a pole 2 and stoppers 5 provided adjustably so that, when the pendulum 3 is displaced relatively with the pole 2, the stopper and pendulum may collide with each other. In the vibrating system consisting of the springs 4 and the pendulum 3, it is possible to use such physical pendulum 6 having a fulcrum 8 as is illustrated in FIGURE 2. They are respectively properly used depending on the nature of the vibration of the pole requiring the vibration to be damped or the space in which the vibration damping apparatus can be installed.

In such formation as is illustrated in FIGURES 1 and 2, when a vibrating energy from outside is applied to the pole, the vibrating energy will be naturally transmitted to the vibrating system formed of the pendulum and springs, thus the body 1 and the pendulum 3 or physical pendulum 6 will vibrate and such pendulum will soon come to collide with the body 1 through the stopper 5. Such collision will be repeated until the vibration of the pole becomes very small. The initially applied vibrating energy will be dissipated and the structure will quickly become stationary.

It is advantageous that the natural frequencies of the pendulum-spring vibrating system or physical pendulum are so made as to be close to the natural frequency of the pole requiring to fit the vibration damping apparatus so that the vibration of the pole may be quickly transmitted to the vibration damping apparatus.

In short, the subject matter of the present invention is only to fit a small pendulum through springs or elements performing the same action as of the springs and stoppers in the position of the largest amplitude in a pole. It is not necessary to connect the apparatus of the present invention with any other thing and to additionally fix a large mass to it as in a conventional damping apparatus utilizing viscus damping or coulomb friction. As a vibration damping apparatus, it can be contained in a very small space and gives an effective vibration damping action.

A substantial embodiment of the construction in the case of damping the vibration of such tubular pole as a lighting pole or a sign pole is shown in the following.

FIGURES 3 to 6 illustrate embodiments of the vibration damping construction in each of which a pendulum is fitted through springs and each of which is contained in the form of a cylinder so as to be able to give a vibration damping effect as easily inserted in any place in a tubular pole which is already installed or is being installed.

Figure 4:
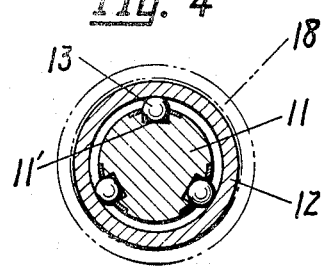
FIGURE 4 is a cross-sectional view on line A—A in FIGURE 3.

As illustrated in FIGURES 3 and 4, a cylindrical case 12 of an outside diameter a little smaller than the inside diameter of a tubular pole 18 is fitted in the tubular pole 18 (not illustrated the method of fitting) so as to be able to be properly fixed and a pendulum 11 is fitted in the central part and balls 13 are fitted at a fixed spacing in the respective positions dividing the periphery of the pendulum 11 into three equal parts within the cylindrical case 12 so as to minimize the frictional loss between the case 12 and pendulum 11. The pendulum 11 is provided with three grooves 11′ axially in the respective positions dividing its periphery into three equal parts and the balls 13 are fitted in said grooves 11′ so as not to easily spring out but to easily rotate. The pendulum 11 fitted with the balls 13 is secured to a disk 16 at each end of the cylindrical case 12 through a spring 15 and bolts 21 and 22. The balls 13 are not limited to be fitted in the grooves in the positions dividing the periphery of the pendulum into three equal parts but may be fitted in any manner in any number of grooves. The bolt 22 to fix the coil spring 15 to the central part on the axis of the tubular pole 18 is passed through each end of the cylindrical case 12. The coil spring 15 is held at one end between said bolt 22 and the disk 16 through a washer 22′ and a nut 22″ is screwed to the bolt projecting out of the disk 16. A cylinder 17 having an inside diameter larger than the outside diameter of the coil spring 15 and acting to stop the swing of the pendulum 11 is fixed to the disk 16 fixed to each end of said cylindrical case.

Figure 5:
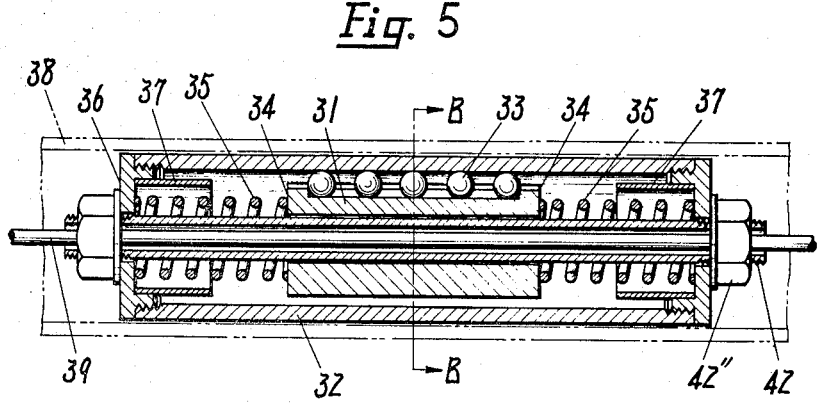
FIGURE 5 is an axially sectional view of a vibration damping apparatus of the present invention as set in the form of a cylinder and made possible to arrange a cable through the axis part.
Figure 6:
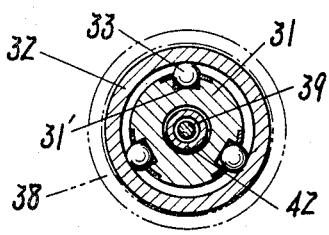
FIGURE 6 is a cross-sectional view on line B—B in FIGURE 5.

Further, in the case of arranging an electric cable 39 through a tubular pole 38 depending on the condition of the use, such construction as is illustrated in FIGURES 5 and 6 is adopted. That is to say, a long tubular bolt 42 threaded at both ends is passed through the axis part of a cylindrical case 32 and a hollow cylindrical pendulum 31 is fitted on the substantially central part of said hollow bolt 42.

That is to say, the hollow cylindrical pendulum 31 having a coil spring 35 at each end and having balls 33 in the grooves is sealed in said cylindrical case 32. A disk 36 provided with a stopper 37 on the inside is fitted to the hollow bolt 42 at each end. A nut 42″ is screwed to each end of the hollow bolt 42 so as to fasten the disk 36. The electric cable 39 for lighting is arranged through the tubular bolt 42.

The vibration damping apparatus of the present invention formed as mentioned above is fitted to the disks 16 or 36 at both ends of the cylindrical case 12 or 32 with some initial tension or initial compression given to the coil springs 15 or 35 and is set in a tubular pole. Therefore, in case the tubular pole 18 or 38 is vibrated, said pendulum 11 or 31 will swing toward the disks 16 or 36 at both ends of the cylindrical case 12 or 32. When the amplitude of the swing becomes large, the pendulum 11 or 31 will collide with the cylindrical stoppers 17 or 37. By this collision, the vibrating energy will be dissipated, the vibration of the tubular pole 18 or 38 will be damped and will become stationary.

In the above embodiment of the present invention, since such vibration damping mechanism as is described above is set in a cylindrical case, no special work is required in the process of making a tubular pole and the vibration damping apparatus can be easily fitted in the tubular pole without changing the appearance.

Further, another embodiment wherein a physical pendulum is housed in a space within a lighting globe in order to reduce the vibration of the lighting pole shall be explained.

In this embodiment, a physical pendulum having a very simple construction is fitted by utilizing a space within a lighting globe so that an effective vibration damping may be made.

In FIGURES 7 to 12, a physical pendulum 55 is suspended with a pin 56 passed through its upper part in a space formed within a globe 51 fixed to the tip of a pole. In order that the vibrating energy from the lighting pole may be easily transmitted, the natural frequency of said physical pendulum 55 is selected to be substantially equal to that of the resiliently supported lighting pole. Further, in order that the physical pendulum may be set in a small space, the shape of the physical pendulum is determined so that the moment of inertia around the fulcrum of the pendulum is made larger.

Usually, as illustrated in FIGURES 8A and 8B, the physical pendulum is smoothly suspended from the globe 51 through a pin 56. But, as illustrated in FIGURE 9, in case that a supporting pole 59 projects into the space in the globe 51, two physical pendulums 55 may be suspended as opposed to each other with the supporting pole 59 held between them. Stoppers 57 with which the physical pendulum 55 will collide when it is displaced more than predetermined clearance relatively with the globe 51 is provided in each of the positions fore and aft the pendulum motion. Such stoppers 57 are made of a substance high in energy absorption at the time of the collision with the pendulum so that the shock absorbing action may be effective.

The above mentioned is of the case that the physical pendulum can swing in one direction only. In case the physical pendulum is to be made possible to swing in any direction so that the damping of the three-dimensional vibration may be more effective, it is supported as illustrated in FIGURE 10. That is to say, the physical pendulum 55 is supported by a pin 61 passed through the opposed sides of a rectangular frame 62 and at the same time the other opposed sides of the frame 62 are supported by pins 60 provided in the globe 51. Therefore, the physical pendulum 55 is supported by the pins 60 and 61 and can swing in any direction around the fulcrum 63 as a center. In such case, too, an annular stopper 57 to restrict the moving range of the physical pendulum is provided in the globe.

If a vibrating energy is given to the lighting pole supported resiliently as mentioned above and the pole begins to vibrate, the vibrating energy will be transmitted also to the physical pendulum 55. When the amplitude of the swing of the physical pendulum 55 becomes large, the pendulum will collide with the stoppers 57. Due to the energy loss caused in such case, a part of the vibrating energy will be dissipated. This collision will be repeated until the vibration of the globe becomes small. The lighting pole will thus become stationary at last.

As described above, according to the present invention, a vibration damping apparatus is provided by utilizing a space in a lighting pole. Therefore, the appearance will not be impaired. Further, by adjusting the shape of the physical pendulum and the distance between the stopper and physical pendulum, there can be obtained a lighting pole adapted to its installing condition and acting effectively to damp its vibration.

Figure 13:
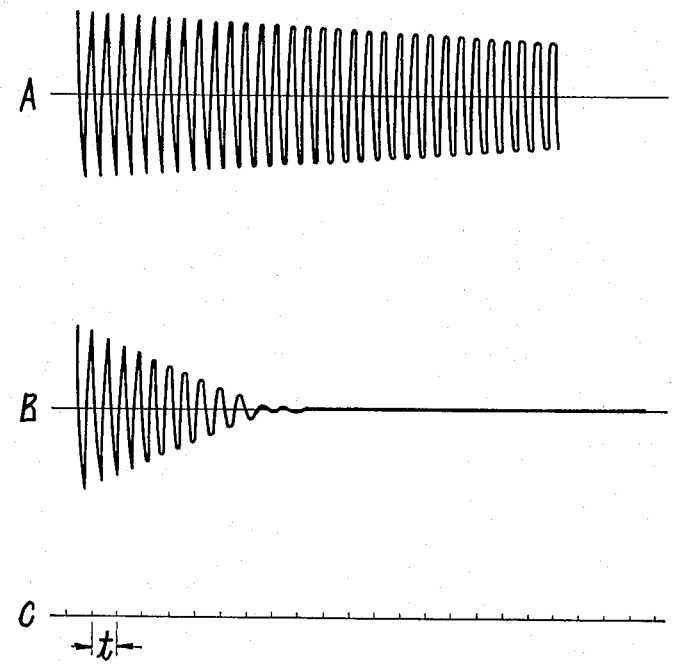
FIGURE 13 is an example of vibration wave form showing the damping effect of a lighting pole fitted with a vibration damping apparatus of the present invention.

FIGURE 13 shows an example of actually measured wave forms of free vibrations representing the vibration damping effect of a lighting pole provided with a vibration damping apparatus of the present invention comparing with a lighting pole without the vibration damping apparatus.

The used lighting pole was of a tapered steel pipe of which the outside diameter of the lower end base was 168 mm., the outside diameter of the tip was 75 mm., the taper was 1/100 and the weight was about 100 kg. The weight of the lighting globe at the tip of the pole was about 17 kg. The height from the base of the uppermost end was 7 m. The free vibration of the pole was taken place by giving the initial deformation artificially about 120 mm. at the tip of the pole.

The wave form A is of the case that no vibration damping apparatus was fitted. The wave form B is of the case that a vibration damping apparatus according to the present invention was installed. Further, the wave form C shows a time pulse in which 1 pulse $t$ is 1 second. The used vibration frequency of the lighting pole was about 1.6 c./s. The vibration damping apparatus was of the type illustrated in FIGURES 5 and 6 as fitted in the globe fitting part 59 illustrated in FIGURE 7. In about 8 seconds, the vibration was substantially completely damped. Thus a great vibration damping effect is shown.

What is claimed is:

1. Apparatus for damping vibration of a structural member comprising a pendulum, means secured to said structural member for suspending said pendulum for free swinging motion in any direction, stopper means secured to said structural member and positioned to permit said pendulum to strike said stopper means upon said pendulum being displaced a predetermined angle.

2. Apparatus for damping vibration as claimed in claim 1 wherein said pendulum has a characteristic frequency equal to that of said structural member.

3. Apparatus for damping vibration as claimed in claim 1 wherein said means for suspending said pendulum and said stopper means are secured to said structural member at a position of large amplitude.

4. Apparatus for damping vibration of a pole comprising a frame member pivotally secured to said pole, a pendulum pivotally supported within said frame, the axis of said latter pivot being at a substantially right angle to said first mentioned pivot whereby said pendulum is capable of swinging in any direction, stopper means secured to said pole and positioned to permit said pendulum to strike said stopper means upon said pendulum being displaced a predetermined angle.

5. Apparatus for damping vibration as claimed in claim 4 wherein said stopper means comprises an annular stopper.

6. Apparatus for damping vibration as claimed in claim 4 wherein the axes of said two pivots are horizontally disposed in the same plane.

7. Apparatus for damping vibration as claimed in claim 4 wherein said frame member and said stopper means are secured to said pole at a position of large amplitude.

References Cited by the Examiner

UNITED STATES PATENTS

| | | |
|---|---|---|
| 2,018,870 | 10/1935 | Paton. |
| 2,155,052 | 4/1939 | Byland _____ 188—1 |
| 2,195,041 | 3/1940 | Von Schlippe _____ 188—1 X |
| 2,618,492 | 11/1952 | Singer _____ 188—1 X |
| 2,715,951 | 8/1955 | Lieber _____ 188—1 |
| 3,020,980 | 2/1962 | Baker et al. _____ 188—1 |

FOREIGN PATENTS

| | | |
|---|---|---|
| 702,263 | 3/1941 | Germany. |
| 950,983 | 3/1964 | Great Britain. |

DUANE A. REGER, *Primary Examiner.*